May 14, 1940.    W. H. PEARCE    2,200,805
MEASURING INSTRUMENT
Filed June 22, 1938

INVENTOR.
WALTER H. PEARCE
BY *George M. Murbach*
ATTORNEY

Patented May 14, 1940

2,200,805

UNITED STATES PATENT OFFICE 2,200,805

MEASURING INSTRUMENT

Walter H. Pearce, North Hills, Pa., assignor to The Brown Instrument Company, Philadelphia, Pa., a corporation of Pennsylvania Application June 22, 1938, Serial No. 215,133

8 Claims. (Cl. 172—239)

This invention relates broadly to a means for effecting a controlling operation in response to the variation in some measurable variable condition, such as the variation of a thermocouple E. M. F.

More specifically, I have devised a means for varying the setting of a potentiometer slide-wire, that is part of an ordinary potentiometer circuit, by a mechanical relay system which has a follow-up device to prevent hunting from taking place. My present apparatus also is provided with a means for resetting the relay at the end of each cycle so that a new reading may be taken with the parts always starting from the same initial position.

In the apparatus, a measurement of the position of a galvanometer pointer, that is subjected to variations in the thermocouple E. M. F., is made by a feeler. This feeler in turn positions a secondary feeler from which the resetting operation of the slide-wire is controlled. The resetting is accomplished by means of a reversible electric motor that is deenergized by the follow-up device when the exact amount of adjustment of the slide-wire has taken place.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Figure 1:
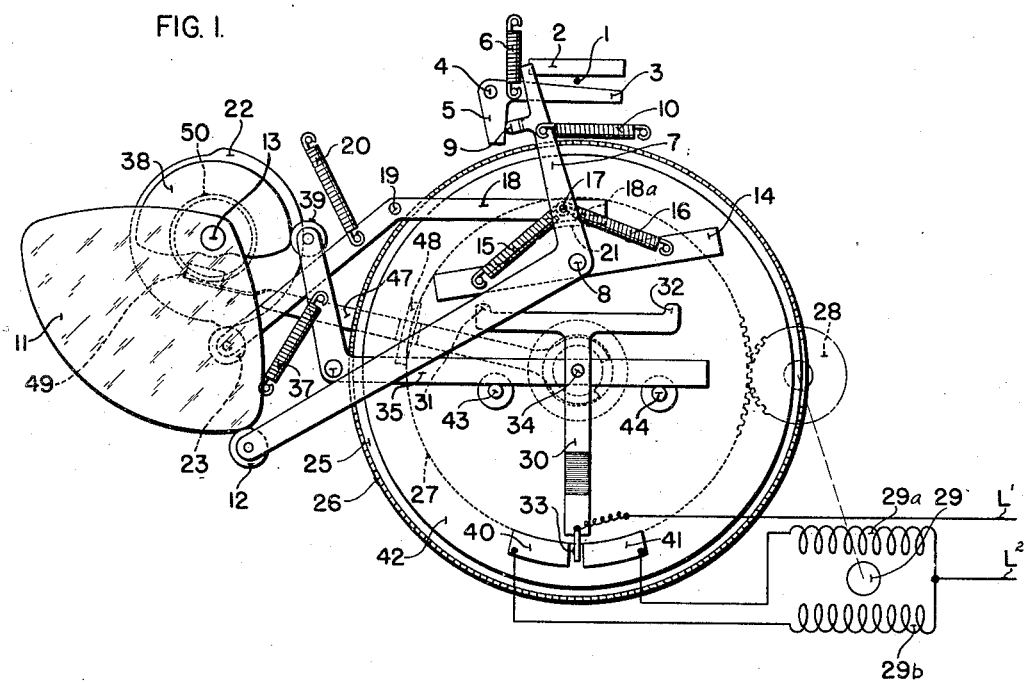
Fig. 1 is a front elevational view of the device.

Referring now to the drawing of which a detailed description will be made, there is shown a galvanometer pointer 1 that is part of a galvanometer which is connected in a potentiometric circuit with a thermocouple and a slide-wire.

Figure 3:
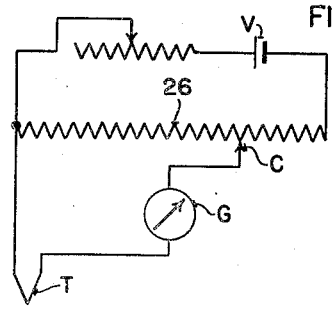
Fig. 3 is a diagrammatic view of a potentiometer circuit.

Potentiometric circuits of the type contemplated herein are well known, such, for example, as disclosed in the Harrison Patent 1,898,124, and include, as is shown diagrammatically in Fig. 3, a known source of voltage V impressed across a resistor 26, commonly termed the instrument slide-wire, the galvanometer G and source of variable voltage, such as a thermocouple T, being connected in series to oppose the known voltage across a variable portion of said resistor 26. The portion of the resistor 26 in circuit is determined by the position of a contact C along the slide-wire, the slide-wire and contact being relatively movable. When the variable voltage, for a given adjustment of the slide-wire, is equal and opposite to the known voltage, the galvanometer is in its null position, but on an increase above or decrease below the known voltage of the unknown voltage, the galvanometer will be deflected in one direction or the other respectively proportionately to the magnitude of the increase or decrease. This invention is concerned with the means by which deflections of said galvanometer control slide-wire adjustments to continuously rebalance the potentiometer system.

The pointer 1 of the galvanometer G is periodically clamped in its deflected position between a stationary abutment 2 and a movable abutment 3 which is normally biased in a counter-clockwise direction by a spring 6 around its pivot 4 and which has a depending arm 5. After the pointer 1 is clamped, its position is measured by a bell-crank shaped primary feeler 7 which is pivoted for movement around a stud shaft 8 that is mounted in the frame of the device. This feeler is provided with a finger 9 which engages arm 5 so that upon counter-clockwise movement of the feeler 7, finger 9 will engage arm 5 and move abutment 3 in a clockwise direction to free the pointer. The means for moving feeler 7 around its pivot 8 in a clockwise direction consists of a spring 10, and the means to move it in a counter-clockwise direction to its inoperative position consists of a cam 11 engaging a roller 12 on the feeler. This cam, along with other cams to be later described, is mounted for rotation with a shaft 13 that is driven in a clockwise direction by any suitable constant speed motor (not shown).

A secondary feeler 14 is also mounted for rotation around shaft 8 and is connected to feeler 7 by light springs 15 and 16, which are each attached to the feeler 7 at point 17 and are attached to the feeler 14 on opposite sides of its pivot as shown. This arrangement permits the secondary feeler to move with the primary feeler and also permits movement of the primary feeler relative to the secondary feeler if one or the other is held.

A means for holding the secondary feeler 14 in its adjusted position while the primary feeler 7 is moved to its initial and inactive position is provided by a brake 18a on the end of the brake-lever 18, which lever is pivoted at 19 and biased in a clockwise direction by a spring 20 toward an arcuate brake-surface 21 formed on the upper edge of secondary feeler 14. The brake is removed from surface 21 by engagement between a cam 22, mounted on shaft 13, and a roller 23 on brake-lever 18.

A slide-wire 26 that forms part of a usual potentiometer circuit is supported on a disc 25 and is mounted for free rotation on a shaft 24. This slide-wire disc 25 has attached to it a gear 27 that is driven to drive the slide-wire by gearing 28 from a reversible motor 29 which is energized to rotate either in one direction or the other, depending upon the direction of deviation of the galvanometer pointer 1 from its mid-position, by a means now to be described.

Figure 2:
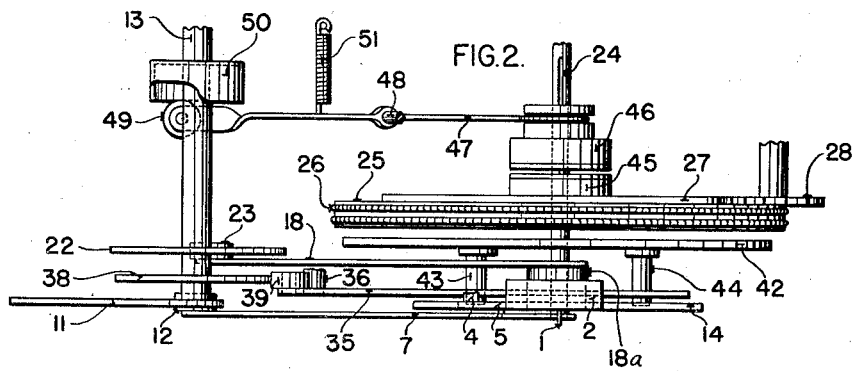
Fig. 2 is a top plan view.

A T-shaped contact making member 30 has, on the ends of its cross-member, projections 31 and 32 and has at the bottom of its vertical member a contact 33. This member 30 is pivoted at 34 on one arm of a bell-crank lever 35 which is in turn pivoted at 36 and moved in a clockwise direction by a cam 38 that bears against a roller 39 on the other arm of the bell-crank against the bias of a spring 37. Contact members 40 and 41 for cooperating with contact 33 are mounted on a disc 42 that is attached to shaft 24 upon which the slide-wire 26 is rotatable. This disc has two pins 43 and 44 on it which are adapted to be engaged at times by the upper edge of bell-crank 35. The disc 42 is also adapted to be rotated with the slide-wire 26 by means of a clutch consisting of a clutch member 45 fastened to gear 27 and a clutch member 46 that is keyed to but slidable on shaft 24. This clutch is engaged and disengaged in timed relation to the rotation of shaft 13 by means of a clutch-shifting lever 47 that is pivoted at 48 and has one end formed as a yoke encircling a groove in the clutch member 46. The other end of lever 47 has a roller 49 that bears on a cam 50 which is used to open the clutch by counter-clockwise movement, in Fig. 2, of lever 47 against the force of a spring 51 which tends to engage the clutch-members.

The various parts of the device, as shown in the drawing, are in the positions they assume at the beginning of a cycle. In the operation of the device, the shaft 13, turning in a clockwise direction, simultaneously brings the high portion of cam 22 under roller 23 to lift the brake 18a from surface 21 and brings the beginning of the low portion of cam 11 under roller 12. When the brake is lifted from surface 21, the secondary feeler 14 moves under the action of springs 15 and 16 to the position shown. As cam 11 continues to rotate, primary feeler 7 moves around its pivot 8 under the influence of spring 10 to first let the abutment 3 clamp pointer 1 in its then position against abutment 2 and next let the feeler 7 move to the right until it has engaged the pointer 1. During the movement of primary feeler 7, the secondary feeler 14 is also moved by springs 15 and 16 to a corresponding position. At the completion of the movement of feeler 7 to the right, the low portion of cam 22 again comes under roller 23, and the brake 18a is applied to surface 21 to hold the feeler 14 in its adjusted position. At this same time, the high portion of cam 11 starts to move feeler 7 counter-clockwise to its initial position in which the pointer 1 is freed from restraint, and the low portion of cam 38 starts under roller 39 to permit lever 35 to move counter-clockwise. Also, at this time, cam 50 has rotated to a position in which spring 51 can engage clutch members 45 and 46.

As lever 35 moves, it will raise the actuating member 30 until the projections 31 and 32 engage the bottom edge of the secondary feeler 14. If the pointer 1 was in its mid-position when contacted by feeler 7, the bottom edge of feeler 14 will be horizontal, and there will be no tilting movement of member 30. If, however, the pointer 1 had been for example, to the left of its mid-position, the lower edge of feeler 14 would be positioned at an angle to the horizontal somewhat smaller than the angle shown in the drawing. In this case, projection 31 will first engage the feeler 14 and cause member 30 to tilt in a counter-clockwise direction to bring contact 33 into engagement with contact 41. In this way, current will flow from L' through contacts 33 and 41 to field 29a of motor 29, then to L² to energize the motor in such a manner that it will rotate the slide-wire 26 in a counter-clockwise direction. Rotation of slide-wire 26 will, through clutch 45, 46, rotate disc 42 carrying contact 41 a like amount so that engagement between contacts 33 and 41 will eventually be broken to stop the motor 29. In this manner, the slide-wire is rotated an amount proportional to the movement of pointer 1, and since the contact 41 moves with the slide-wire, there can be no over-travel.

By the time the slide-wire has stopped rotating the lowest portion of cam 38 has come under roller 39 and the high portion is starting thereunder to move lever 35 back to its initial position, shown in Fig. 1, and cam 50 opens clutch 45, 46 to disconnect disc 42 from the slide-wire 26. As lever 35 is moved clockwise by the cam 38, its lower edge will engage pins 43 and 44 to rotate the disc 42 back to its original position where the pins are horizontal, and, at the same time, lever 35 lowers member 30 so that it can assume its original position. The cycle of operation is completed as the high portion of cam 38 comes under roller 39 to again bring the parts to the position of Fig. 1. It will be noted that the sensitiveness of the device can be varied by changing the distance between contacts 40 and 41 so that contact 33 will have more or less distance to move before it engages them.

From the above description, it will be seen that I have provided a simple and efficient device for moving a slide-wire an amount that is in exact proportion to the amount of deviation of a galvanometer pointer from its mid-position. By the expedient of moving the disc carrying the contacts with the slide-wire, I prevent any possibility of over-travel and consequent hunting. Since the movable contacts are restored to their original positions at the end of each cycle, it is possible to use only the two movable contacts and a secondary feeler.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a measuring instrument, an element deflecting in accordance with a measurable condition, and means to return said element to its normal position comprising a contact member, means to move said contact member to a position corresponding to that of said element, a motor energizable for rotation in a direction depending upon the movement of said contact member, a second contact member cooperating with said first member to energize the motor, means driven by the motor to move the second member an amount depending upon movement of the first member, and means adapted to restore said contact members to their original positions.

2. In a measuring instrument, an element deflecting in accordance with a measurable condition, and means to return said element to its normal position comprising a pivoted lever, a part pivoted thereon and having a first contact, means for moving said lever and said part to a position corresponding to that of said element, a rotatable disc having a second contact thereon cooperating with said first contact, an electric motor, means for moving said second contact by said motor an amount corresponding to the movement of said first contact, and means for moving said lever to restore said first and second contacts to their initial positions.

3. In a measuring instrument, a rotatable disc having a pair of spaced contact members thereon, a third contact member cooperating with either of said pair of contact members, an element deflectable in accordance with a measurable condition, an electric motor adapted to be energized when said third contact and one of said pair of contacts is engaged, means to move said third contact to a position corresponding to that of said element and thereby engage one of said pair of contacts to energize said motor, means driven by said motor to rotate said disc and move said pair of contacts in direction and to an extent depending upon the movement of said third contact member, means to restore said contact members to their original positions, and means to return said element to a normal position in response to energization of said motor.

4. In a measuring instrument, an element deflecting in accordance with a measurable condition, a potentiometer slide-wire, means for rotating said slide-wire an amount proportionable to said deflection, said means consisting of a motor, a first contact movable to a position corresponding to that of said element, a second contact cooperating with said first contact when it is moved to energize said motor, and means to restore said first contact to its initial position.

5. In a measuring instrument, an element deflectable in accordance with a measurable condition, a potentiometer slide-wire, a motor to rotate said slide-wire, a first contact movable to a position corresponding to that of said element, a second contact cooperating with said first contact to energize said motor, a clutch between said slide-wire and second contact, means to engage said clutch when said motor is energized so said second contact will be moved an amount corresponding to that of said slide-wire, means to disengage said clutch, and means to thereafter restore said contacts to their initial positions.

6. In a self-balancing potentiometer, an element deflecting in accordance with potentiometer unbalance, a contact member, means adapted to adjust said contact member from an initial position into a position depending upon the deflection of said element, a reversible electrical control motor adapted to rebalance said potentiometer and energized for rotation in one direction or the other depending upon the direction of movement of said contact member, a second contact member cooperating with the first-mentioned contact member, means adapted to move the latter in a direction and to an extent depending upon the extent of movement of the first-mentioned contact member, and means adapted to restore said contact members to said initial position.

7. In a normally self-balancing electrical network deflecting means responsive to unbalance of said network, apparatus to positively measure the position of said means, a reversible motor to rebalance said network, contact means closed by said apparatus to energize said motor for rotation in a direction and amount proportional to the extent and direction of movement of said deflecting means, and means to return said apparatus and contacts to their initial position.

8. In a normally self-balancing electrical network, means responsive to unbalance of said network including a freely deflecting member, electrical reversible motor means for rebalancing said network, a movable arm engaging said member and positioned in accordance with the extent and direction of deflection thereof, a pair of circuits for said motor, a movable contact common to either circuit, means operative to position said contact in accordance with the position of said arm to thereby close one of said circuits to energize said motor, and means to deenergize said motor upon rebalancing of said network.

WALTER H. PEARCE.